(Model.)
L. J. ANGER.
DOUGH CUTTING MACHINE.
No. 274,892. Patented Apr. 3, 1883.
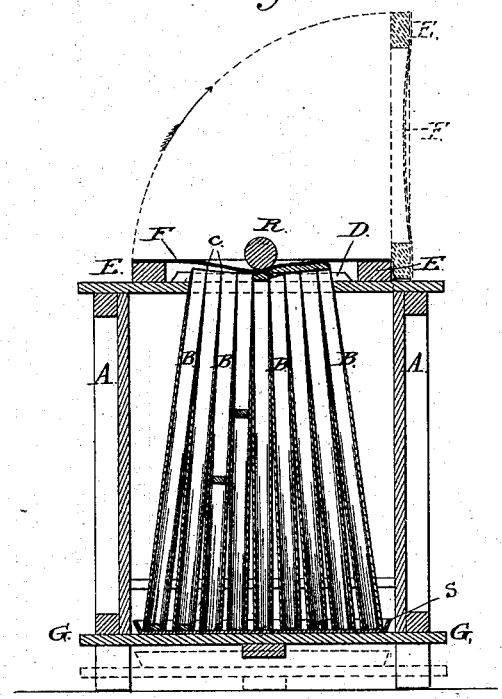
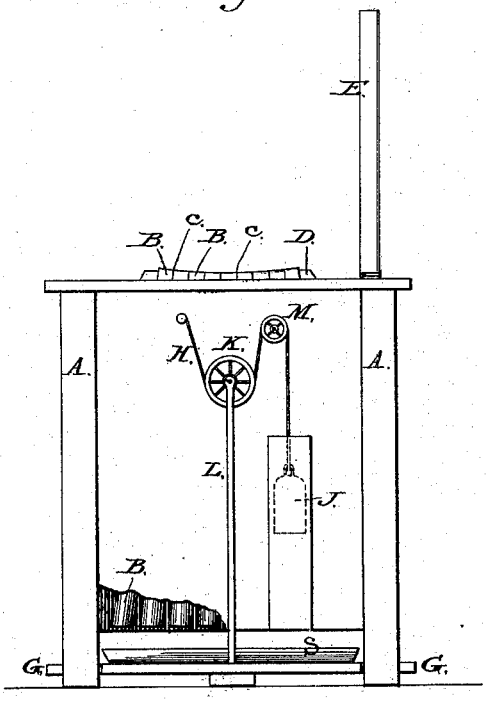
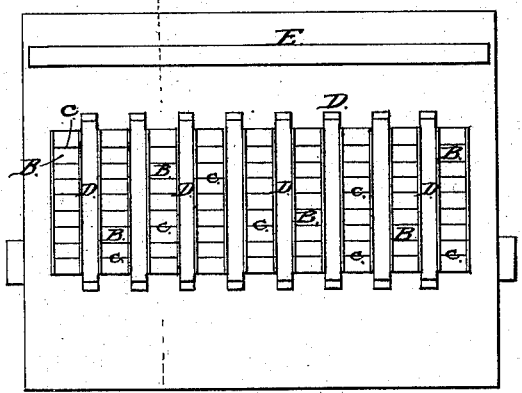
Witnesses:
John A. Ellis
C. F. LaMont
Inventor:
Louis J. Anger
By Daniel A. Burr
Attorney.

UNITED STATES PATENT OFFICE.

LOUIS J. ANGER, OF NEW YORK, N. Y., ASSIGNOR TO JOHN A. ANGER & BROTHER, OF SAME PLACE.

DOUGH-CUTTING MACHINE.

SPECIFICATION forming part of Letters Patent No. 274,892, dated April 3, 1883.

Application filed September 18, 1882. (Model.)

*To all whom it may concern:*

Be it known that I, LOUIS J. ANGER, of the city, county, and State of New York, have invented a new and useful Improvement in Dough-Cutting Machines; and I do hereby declare that the following is a full and exact description thereof, reference being had to the accompanying drawings, and to the letters of reference marked thereon, making a part of this specification.

My invention relates to a machine for cutting out and panning spice-cakes, sweet crackers, &c.; and has for its object the rapid cutting out and depositing of the cakes in pans ready for baking in exact order and with great precision.

It consists in a series of upwardly-converging tubes arranged in vertical parallel rows, the contiguous upper edges of the upper ends of the tubes in each row being consolidated to form dividing-cutters, and their lower ends so far separated as to admit of the separate deposit through each of the cakes cut out and forced into their upper end; and in the combination, with these tubes, first, of an elastic pressure-plate constructed to fit down upon the upper ends of the tubes, so as to transmit the pressure of a roller applied to the outer surface of the plate to the sheets or strips of dough interposed between it and the tubes, and thereby force the dough down upon the cutting-edges and into the tubes; and, second, of a movable counterbalance-platform suspended to move to and from the lower ends of the tubes to serve as a movable support for the pans which receive the cakes of dough dropping from the tubes.

In the accompanying drawings, Figure 1 is a transverse vertical section of one of the rows or sets of cutting-tubes in line $x\ x$ of Fig. 3; Fig. 2, a side elevation, and Fig. 3 a top view, of the machine with its elastic platen elevated.

A A is the stand or frame-work, supporting my machine, partially inclosed at the sides and ends.

B B B are the cutting and conducting tubes. These tubes, made of metal with sharp upper edges, are arranged in rows in parallel vertical planes, which are separated by uniform intervals. The tubes in each row converge radially toward the top, so that while the lower end of each tube is separated by a narrow space from that adjacent to it, their upper ends are brought into close contact and are so united, each to each, as to form a single dividing-edge, c, which is sharpened to form a cutting-blade. The upper ends of the converging tubes in each row are made to terminate in the arc of a circle having its center at the point at which they would intersect, if prolonged. (See Fig. 1.) Strips of wood or metal D D, Fig. 3, of lesser height than the tubes, are interposed between the rows, to steady them and to fill up the intervening space. The tops of the tubes and of the interposed strips D are made to project above the top of the stand A A, and are encircled by a frame, E, hinged to open up therefrom. Upon this hinged frame E a thick sheet of rubber, F, is stretched, so as to fit over and upon the tops of the tubes when the frame is closed and form an elastic platen thereon, as shown in positive lines in Fig. 1. The upper ends of the tubes are rectangular in shape, to correspond with the form of the cakes to be cut thereby; but as they diverge the tubes gradually enlarge and are made to assume a cylindrical form, so that the dough, when cut, may drop freely through them.

A platform or movable table, G, is suspended within the frame A by means of cords H and counterbalance-weights J at either end thereof, immediately under the lower ends of the cutting and dropping tubes. This platform moves freely up and down between the posts of the frame, and is raised automatically against the tubes by means of weights. The supporting-cords H are each secured at one end to the frame, and led thence under a friction-roller, K, upon the upper end of a rod, L, at each end of the platform G, and, passing thence over pulleys M upon the side of the frame, are attached to the counterbalance-weights J. The counterbalance-weights J and the suspension-rods L, being placed outside of the frame E, are incased, to prevent any interference with their movements. The ends of the frame are cased up, but the sides are left open near the bottom, to permit the cake-pans S to be set in upon the platform and removed therefrom when filled.

In the use of my machine, the pressure-frame E being thrown up and a pan, S, placed upon the platform, the platform is allowed to rise until the bottom of the pan comes into contact with the lower ends of the tubes. The operator, standing in front of the machine, thereupon lays strips of prepared dough of the proper width and thickness over and upon the cutting ends of the dropping-tubes B B, and closing down the pressing-frame E, so that the rubber platen shall rest upon the strips of dough, runs a roller, R, Fig. 1, back and forth over the platen, thereby forcing the dough upon the cutters, which divide it so that each tube receives a bit of the same form and dimensions. These bits of dough, thus cut out and uniformly shaped without any waste whatever, drop through the tubes upon the pan below, each in an exact position. The operator, by a movement of his foot, now forces down the platform, and the pan, filled with the bits of dough of uniform size, arranged therein with mathematical precision, is quickly removed by an attendant, who replaces it with an empty one.

The pressure-frame E may be formed with a lever projecting outwardly therefrom, and be fitted with an elastic cushion or platen, stiff enough to produce, when carried down by the lever upon the dough, the pressure thereon needed to cut it out without the use of a separate roller, R.

In the operation of my improved machine, as described, the cakes are cut out with great rapidity and neatness, without waste, of exact uniformity in size and appearance, and are automatically dropped into the pans in precisely the best order required for their perfection in baking.

I claim as my invention—

1. The combination, with the frame or stand of a cake-cutting machine, of a series of tubes arranged in vertical parallel rows, the several tubes in each row being slightly separated at their lower ends and made to converge, so as to come together at their upper ends, the contiguous edges of the tubes brought into contact being consolidated and so finished as to form in each case a single cutting-edge, substantially in the manner and for the purpose herein set forth.

2. The combination, in a cake-cutting machine, with a series of upright tubes terminating at their upper ends in cutting-edges, of an elastic pressure-plate constructed substantially as described, whereby it may close down over the upper ends of said tubes and transmit such pressure as may be applied to its outer surface to the material interposed between the plate and tubes, and so force the material into the latter, substantially in the manner and for the purpose herein set forth.

3. The combination, in a cake-cutting machine, with a series of dropping-tubes, B B B, and with a frame or stand supporting the same, of a movable counterbalanced platform, G, substantially in the manner and for the purpose herein set forth.

In testimony whereof I have signed my name to this specification in the presence of two subscribing witnesses.

LOUIS J. ANGER.

Witnesses:
DANIEL R. GARDEN,
DAVID A. BURR.